US009933869B2

(12) United States Patent
Zou (10) Patent No.: US 9,933,869 B2
(45) Date of Patent: Apr. 3, 2018

(54) TOUCH SUBSTRATE, TOUCH PANEL AND DISPLAY DISPLAY

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 14/779,887

(22) PCT Filed: Apr. 3, 2015

(86) PCT No.: PCT/CN2015/075872
§ 371 (c)(1),
(2) Date: Sep. 24, 2015

(87) PCT Pub. No.: WO2016/086561
PCT Pub. Date: Jun. 9, 2016

(65) Prior Publication Data
US 2016/0328035 A1 Nov. 10, 2016

(30) Foreign Application Priority Data
Dec. 3, 2014 (CN) .......................... 2014 1 0724519

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01); *G06F 2203/04102* (2013.01); *G06F 2203/04103* (2013.01)

(58) Field of Classification Search
CPC .................................. G06F 3/044; G06F 3/047
See application file for complete search history.

(56) References Cited

U.S. PATENT DOCUMENTS 9,256,309 B2 * 2/2016 Lee .......................... G06F 3/044
2012/0007830 A1 1/2012 Liao et al.
(Continued)

FOREIGN PATENT DOCUMENTS

CN      101719038 A    6/2010
CN      102707514 A    10/2012
(Continued)

OTHER PUBLICATIONS

First Chinese Office Action regarding Application No. 2014/107245194 dated Dec. 19, 2016. Translation provided by Dragon Intellection Property Law Firm.
(Continued)

*Primary Examiner* — Dorothy Harris
(74) *Attorney, Agent, or Firm* — Harness, Dickey & Pierce, P.L.C.

(57) ABSTRACT

The present disclosure provides a touch substrate, a touch panel and a display device. The touch substrate includes a periphery area and a touch area. The touch area includes a first edge and a second edge opposite to each other. The touch substrate includes: bonding terminals arranged in the periphery area, touch electrodes arranged in the touch area and signal transmission lines connecting the bonding terminals and the touch electrodes. The signal transmission lines are arranged between the first edge and the second edge.

17 Claims, 12 Drawing Sheets

(56) References Cited

U.S. PATENT DOCUMENTS

| | | | |
|---|---|---|---|
| 2012/0306776 A1 | 12/2012 | Kim et al. | |
| 2013/0162596 A1* | 6/2013 | Kono | G06F 3/044 345/174 |
| 2014/0084992 A1* | 3/2014 | Chen | G06F 3/0412 327/517 |
| 2015/0338951 A1* | 11/2015 | Lee | G06F 3/044 345/174 |

FOREIGN PATENT DOCUMENTS

| | | |
|---|---|---|
| CN | 103163677 A | 6/2013 |
| CN | 103197784 A | 7/2013 |
| CN | 103472963 A | 12/2013 |
| CN | 103488332 A | 1/2014 |
| CN | 203414926 U | 1/2014 |
| CN | 103995616 A | 8/2014 |
| CN | 104461135 A | 3/2015 |
| CN | 204302941 U | 4/2015 |
| WO | WO 2013163882 A1 * 11/2013 | ......... G02F 1/13338 |

OTHER PUBLICATIONS

Written Opinion and Search Report regarding International Application No. PCT/CN2015/075872. Translation provided by Dragon Intellectual Property Law Firm.

* cited by examiner

TOUCH SUBSTRATE, TOUCH PANEL AND DISPLAY DISPLAY

CROSS-REFERENCE TO RELATED APPLICATIONS

This application is the U.S. national phase of PCT Application No. PCT/CN2015/075872 filed on Apr. 3, 2015, which claims a priority to Chinese Patent Application No. 201410724519.4 filed on Dec. 3, 2014, the disclosures of which are incorporated in their entirety by reference herein.

TECHNICAL FIELD

The present disclosure relates to the field of touch control technology, and in particular to a touch substrate, a touch panel and a display device.

BACKGROUND

Touch screen is an external input device which has been applied more and more widely, which realizes an input via touching a touch panel by a certain object such as finger or electronic stylus, such that a human-machine interaction may be more direct. The touch screen is simple, convenient and user-friendly.

Figure 1:
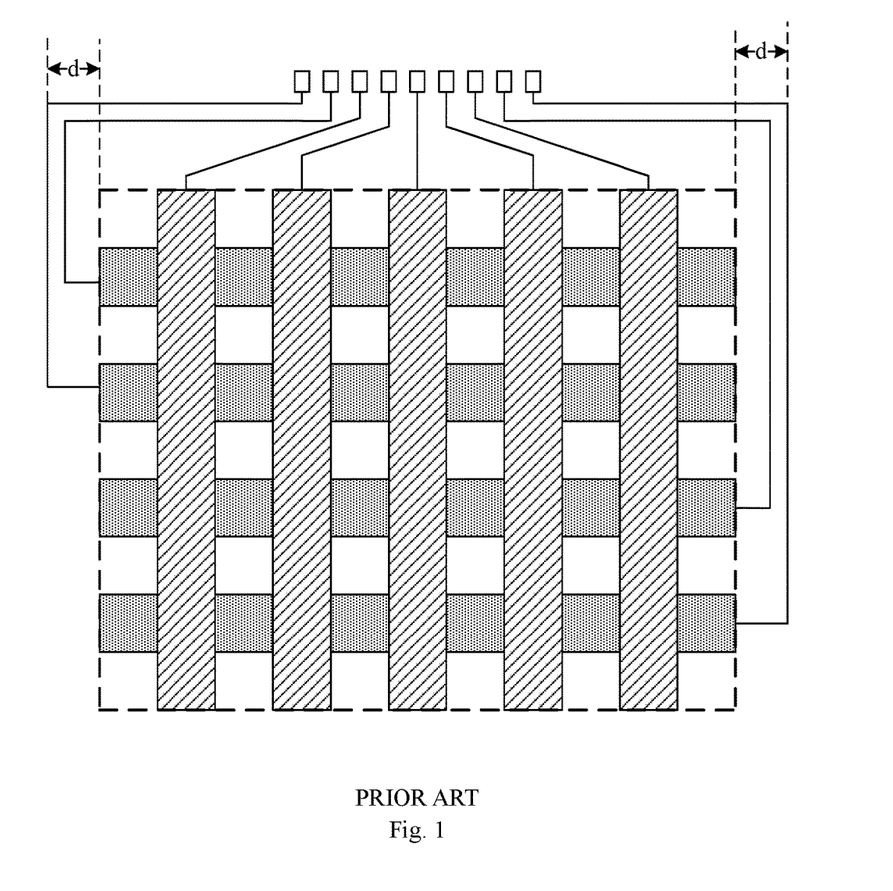
FIG. 1 is a schematic view showing a structure of a touch substrate in the related art.

As shown in FIG. 1, a touch panel in the related art includes a touch area (the area surrounded by the dotted frame) and a periphery area, where bar-like touch electrodes which are crossed to each other are arranged in the touch area of the touch panel.

All the bar-like touch electrodes arranged in the touch area are electrically connected to bonding terminals via signal transmission lines arranged in the periphery area, so as to electrically connect the touch electrodes to a touch drive chip (not shown in FIG. 1) via the bonding terminals, such that signals for location detection (including emitting signals and sensing signals) are transmitted between the touch electrodes and the touch drive chip.

However, in order to make an electronic product artistic and convenient to use, it is more desirable to design a narrower border for the electronic product or even make the electronic product without a border. However, as shown in FIG. 1, the signal transmission line arranged in the periphery area in the related art has a certain width (e.g., 20 um), and there exists a certain distance between the signal transmission lines (e.g., 30 um). Therefore, in the related art, the border of the touch panel needs to be wide enough (i.e., width d shown in FIG. 1) to shield the periphery area where the signal transmission lines are arranged, however a narrow border or a no-border design cannot be realized.

SUMMARY

It is to provide a touch substrate, a touch panel and a display device, to make a border of a touch panel narrower.

To achieve the above objective, a touch substrate is provided in an embodiment of the present disclosure, including a periphery area and a touch area, where the touch area includes a first edge and a second edge opposite to each other, where the touch substrate includes bonding terminals arranged in the periphery area, touch electrodes arranged in the touch area and signal transmission lines connecting the bonding terminals and the touch electrodes, where the signal transmission lines are arranged between the first edge and the second edge.

In the above touch substrate, the bonding terminals include a first bonding terminal and a second bonding terminal arranged between the first edge and the second edge;

the touch electrodes include a first touch electrode and a second touch electrode;

the signal transmission lines include a first signal transmission line connecting the first bonding terminal and the first touch electrode and a second signal transmission line connecting the second bonding terminal and the second touch electrode;

where the first touch electrode extends toward a display area from the bonding terminals, and the second touch electrode and the first touch electrode are crossed to each other, and the first signal transmission line and the first touch electrode are arranged in a same layer;

where the second signal transmission line includes:

a first part arranged in a different layer from the second touch electrode;

a second part connected to the first part through a via hole, where the second part is arranged in the touch area and in a same layer with the second touch electrode and electrically connected to the second touch electrode.

In the above touch substrate, the first part and the first touch electrode are arranged in a same layer.

The above touch substrate further includes:

a first virtual touch electrode, arranged between the first part and an adjacent first touch electrode; and/or a second virtual touch electrode, arranged between the second part and an adjacent second touch electrode.

In the above touch substrate, the first touch electrode, the second touch electrode, the first virtual touch electrode and the second virtual touch electrode are formed by metal grids, where the touch substrate further includes at least one conductive connecting line, where each conductive connecting line corresponds to one metal grid and joints a plurality of sharp point structures of the corresponded metal grid together.

In the above touch substrate, first parts connected to different second touch electrodes vary in length, where the touch substrate further includes:

a first compensating line corresponding to the first part and arranged in the touch area, where the first compensating line extends from an end of the corresponded first part away from the bonding terminals to an edge of the display area, and the first compensating line is electrically isolated from the corresponded first part.

In the above touch substrate, second parts connected to different second touch electrodes vary in length, where the touch substrate further include:

a second compensating line corresponding to the second part and arranged in the touch area, where the second compensating line extends from an end of the corresponded second part connected to the first part to an edge of the display area, and the second compensating line is electrically isolated from the corresponded second part.

To achieve the above objective, a touch panel including the above touch substrate is further provided in an embodiment of the present disclosure.

To achieve the above objective, a touch display device is further provided in an embodiment of the present disclosure, including the above touch panel.

The embodiments of the present disclosure has the following advantages: in the touch substrate, the touch panel and the display device according to the embodiments of the present disclosure, the signal transmission lines are arranged between the two edges opposite to each other of the touch area, such that there is no need to arrange in the touch substrate the signal transmission lines outside the two edges opposite to each other, therefore there is no need to arrange a border outside the two edges opposite to each other, thereby the border of the touch substrate may be made narrower.

DETAILED DESCRIPTION

In a touch substrate and a touch display device according to the embodiments of the present disclosure, signal transmission lines are arranged between two edges opposite to each other of the touch area, such that there is no need to arrange in the touch substrate the signal transmission lines outside the two edges opposite to each other, therefore there is no need to arrange a border outside the two edges opposite to each other, thereby the border of the touch substrate may be made narrower.

A touch substrate according to an embodiment of the present disclosure includes a periphery area and a touch area, where the touch area includes a first edge and a second edge opposite to each other, where the touch substrate includes: bonding terminals arranged in the periphery area, touch electrodes arranged in the touch area and signal transmission lines connecting the bonding terminals and the touch electrodes, where the signal transmission lines are arranged between the first edge and the second edge.

Figure 2:
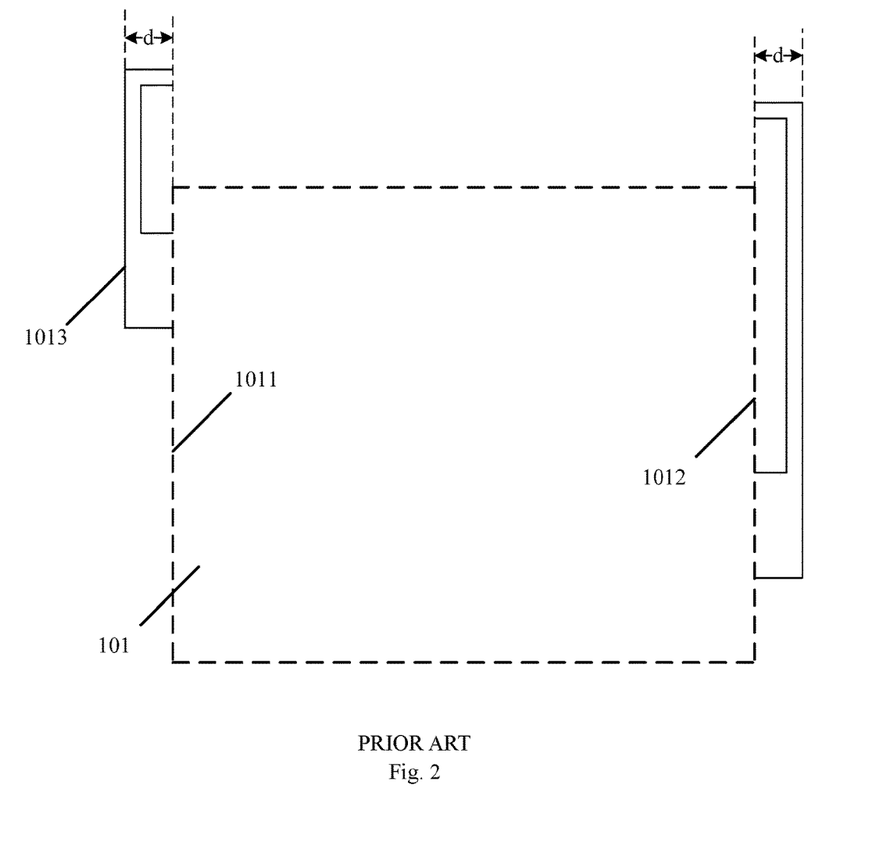
FIG. 2 is a schematic view showing a comparison between a touch substrate according to an embodiment of the present disclosure and the touch substrate in the related art.

As shown in FIG. 2, the touch area 101 of the touch substrate according to the embodiment of the present invention includes a first edge 1011 and a second edge 1012 opposite to each other. In the embodiment of the present disclosure, all the signal transmission lines connecting the bonding terminals and the touch electrodes are arranged between the first edge 1011 and the second edge 1012, so there is no signal transmission line 1013 as shown in FIG. 2 at both a left side (i.e., on the left side of the first edge 1011) and a right side (i.e., on the right side of the second edge 1012) of the touch area 101, as compared with the related art.

There is no signal transmission line at both the left and right sides of touch area, while a border is configured to shield the signal transmission lines arranged in the periphery area, so there is no need to arrange a border at both the left and right sides of the touch area 101, thereby the border of the touch substrate may be made narrower.

In the above illustration, the first edge and the second edge are the left and right edges of the touch area 101. However, when the signal transmission lines are arranged between an upper edge and a lower edge opposite to each other, there is no need to arrange a border at both an upper side and a lower side of the touch area 101, thereby the border of the touch substrate may be made narrower.

The embodiment of the present disclosure may be described in detail as follows.

Figure 3:
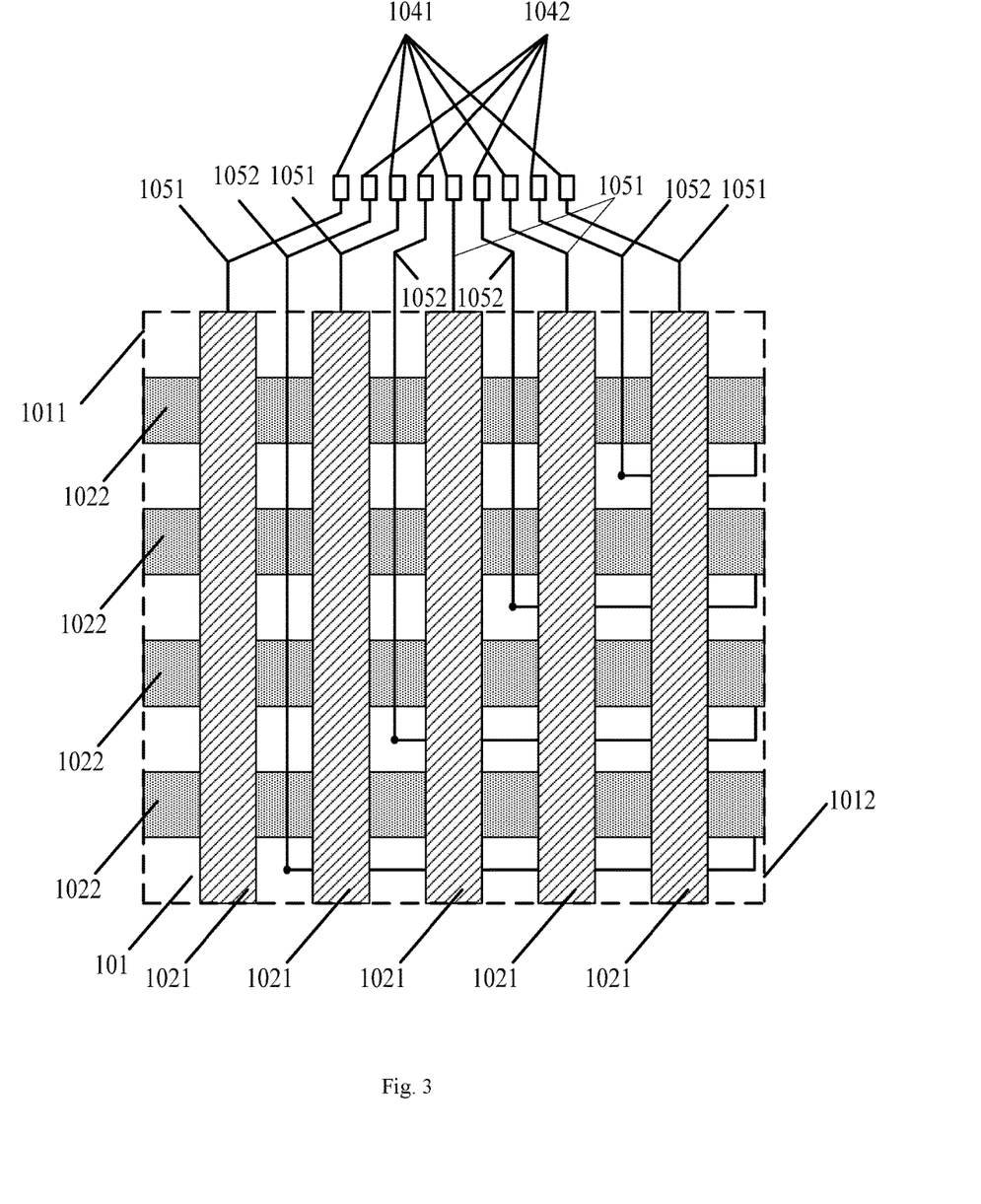
FIG. 3 is a schematic view showing the structure of a touch substrate according to an embodiment of the disclosure.

As shown in FIG. 3, in the embodiment of the present disclosure, the boding terminals include a first bonding terminal 1041 and a second bonding terminal 1042 arranged between the first edge 1011 and the second edge 1012.

The touch electrodes include a first touch electrode 1021 and a second touch electrode 1022.

The signal transmission lines include a first signal transmission line 1051 connecting the first bonding terminal 1041 and the first touch electrode 1021 and a second signal transmission line 1052 connecting the second bonding terminal 1042 and the second touch electrode 1022.

The first touch electrode 1021 extends toward the display area 101 from the bonding terminal 1041/1042, and the second touch electrode 1022 and the first touch electrode 1021 are crossed to each other.

The first signal transmission line 1051 and the first touch electrode 1021 are arranged in a same layer.

The second signal transmission line 1052 includes:

a first part, arranged in a different layer from the second touch electrode 1022; and a second part, connected to the first part through a via hole, where the second part is in the touch area 101 and arranged in a same layer with the second touch electrode 1022 and electrically connected to the second touch electrode 1022.

As shown in FIG. 1 and FIG. 3, in the touch substrate according to the embodiment of the present disclosure, the distribution and connection of the second signal transmission lines 1052 between the second touch electrodes 1022 and the second bonding terminals 1042 are changed compared with that in the related art. The locations of the second signal transmission lines 1052 between the second touch electrodes 1022 and the second bonding terminals 1042 are changed completely as compared with that in the related art, such that all the second signal transmission lines 1052 are arranged between the first edge 1011 and the second edge 1012. The second signal transmission line 1052 is connected to the second touch electrode 1022, where the second signal transmission line 1052 includes two parts.

As shown in FIG. 3, the second signal transmission line 1052 includes two parts, where a first part and the second touch electrode 1022 are arranged in different layers (in view of simplifying the manufacturing process and reducing the cost, the first part and the first touch electrode 1021 are arranged in a same layer according to the embodiment of the present disclosure; however, it may be understood that, the first part may be arranged in any layer other than the layer where the second touch electrode 1022 is arranged, as long as the first part is not electrically connected to the second touch electrode 1022 directly), and a second part is arranged in a same layer with the second touch electrode 1022 and electrically connected to the second touch electrode 1022. The first and the second parts are connected through a via hole.

As shown in FIG. 3, the two parts of the second signal transmission line 1052 are both arranged between the first edge 1011 and the second edge 1012, such that there is no need to arrange signal transmission lines at the sides of the first edge 1011 and the second edge 1012 away from the touch area 101. Therefore, there is no need to arrange a border at both the left and right sides of the touch area 101, thereby the border of the touch substrate may be made narrower.

As shown in FIG. 1 and FIG. 3, there is no signal transmission line in the touch area of the touch substrate in the related art. However, the second signal transmission lines 1052 are arranged in the touch area 101 of the touch substrate according to the embodiment of the present disclosure, whereby the border may be made narrower, as shown in FIG. 3.

When the second signal transmission lines 1052 are arranged in the touch area 101, signals transmitted via the second signal transmission lines 1052 may influence the signals of the first touch electrodes 1021 and/or the second touch electrodes 1022, thus a touch performance of the touch substrate may be influenced.

Figure 4:
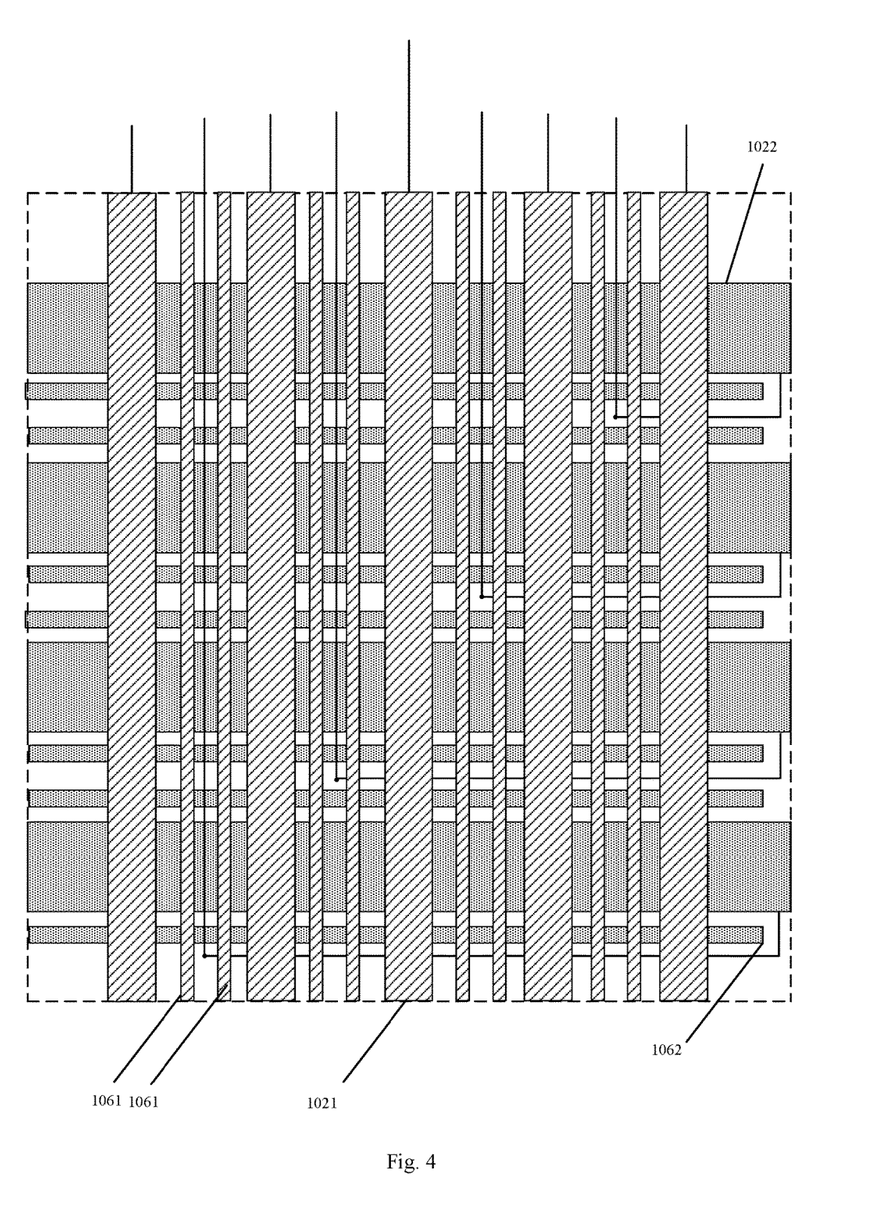
FIG. 4 is a schematic view showing a structure of a touch substrate added with touch virtual electrodes according to an embodiment of the disclosure.

To reduce the influence of the second signal transmission lines 1052 arranged in the touch area 101 on the touch electrodes, the touch substrate according to the embodiment of the present disclosure further includes (as shown in FIG. 4):

a first virtual touch electrode 1061, arranged between the first part and an adjacent first touch electrode 1021; and/or a second virtual touch electrode 1062, arranged between the second part and an adjacent second touch electrode 1022.

By arranging the first virtual touch electrode 1061 and second virtual touch electrode 1062 hereinabove, there exist virtual touch electrodes between the adjacent first touch electrodes 1021, between the second signal transmission lines 1052 and the adjacent second touch electrodes 1022. Such virtual touch electrodes form a signal shielding area including areas between the adjacent first touch electrodes 1021 and between the second signal transmission lines 1052 and the adjacent second touch electrodes 1022, such that the influence of the signals transmitted via the second signal transmission lines 1052 on the signals of the first touch electrodes 1021 and the second touch electrodes 1022 may be reduced, thereby improving the touch performance.

In the related art, a touch substrate and a display substrate are generally used together, and the touch substrate and the display substrate may influence each other to some extent. For the related art, there exist second signal transmission lines 1052 in the touch area, and the second signal transmission lines 1052 connected to different second touch electrodes 1022 vary in both longitudinal length and horizontal length. As shown in FIG. 3 and FIG. 4, the second signal transmission line 1052 connected to the lowest second touch electrode 1022 is longest in both longitudinal and horizontal directions, and the second signal transmission line 1052 connected to the top second touch electrode 1022 is shortest in both longitudinal and horizontal directions. As a result, the second signal transmission lines 1052 are not distributed uniformly in the touch area 101, thus the influences of the second signal transmission lines 1052 on the different parts of the display area may be different and then the display effect of the different parts of the display area may be different.

Figure 5A:
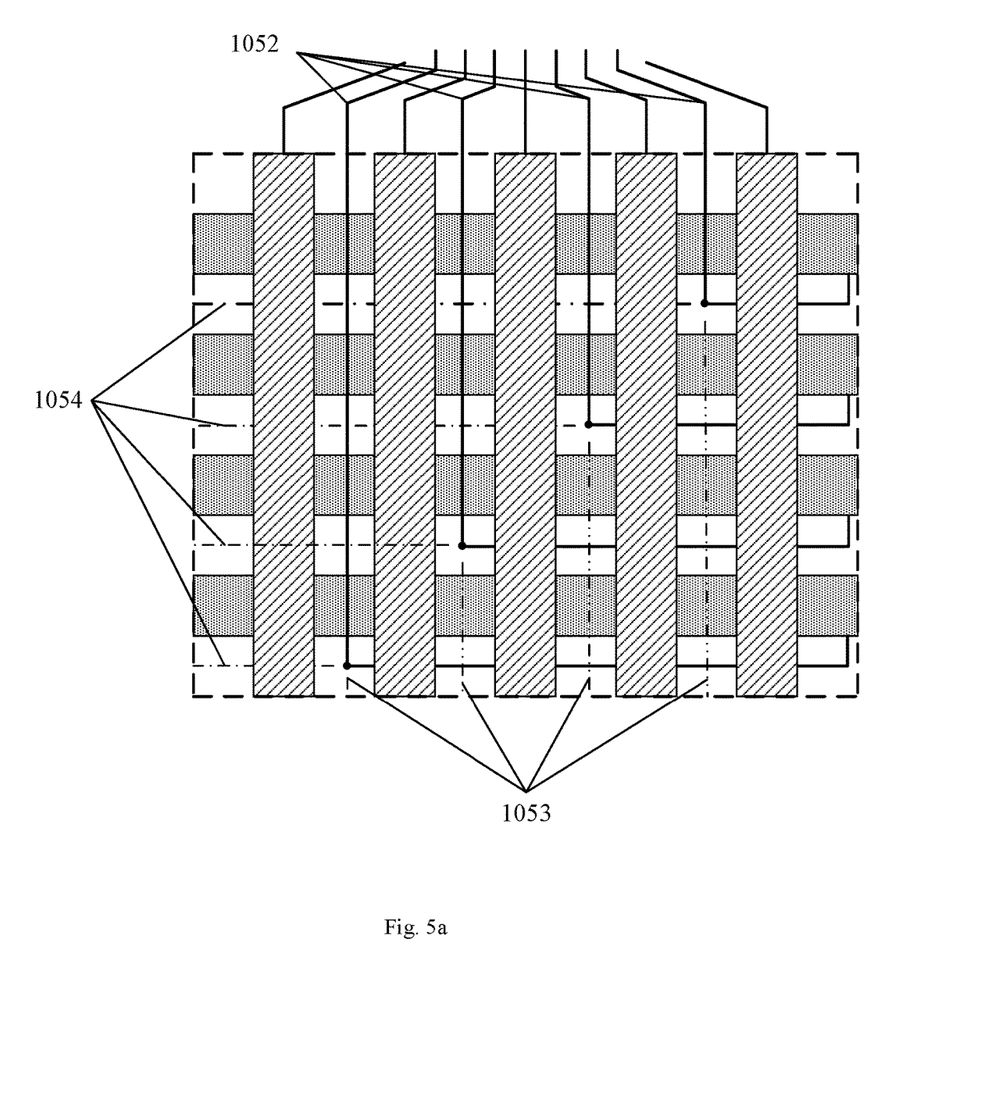
FIG. 5a is a schematic view showing a structure of a touch substrate added with compensating lines according to an embodiment of the disclosure.

In order to reduce the influence caused by the nonuniform distribution of the signal transmission lines, first parts (i.e., the parts arranged in a same layer with the first touch electrodes 1021) of the second signal transmission lines 1052 connected to different second touch electrodes 1022 vary in length in the embodiment of the present disclosure. As shown in FIG. 5a, the touch substrate further includes:

a first compensating line 1053 corresponding to the first part and arranged in the touch area 101, where the first compensating line 1053 extends from an end of the corresponded first part away from the bonding terminals to an edge of the display area, and the first compensating line 1053 is electrically isolated from the corresponded first part.

In addition, second parts (i.e., the parts arranged in a same layer with the second touch electrodes 1022) of the second signal transmission lines 1052 connected to different second touch electrodes 1022 vary in length. As shown in FIG. 5a, the touch substrate further includes a second compensating line 1054 corresponding to the second part and arranged in the touch area 101, where the second compensating line 1054 extends from an end of the corresponded second part connected to the first part to an edge of the display area, and the second compensating line 1054 is electrically isolated from the corresponded second part.

It should be understood that, although the first compensating line 1053 and second compensating line 1054 hereinabove appear as dotted lines, it does not mean that the transmission line is disconnected.

It can be seen that, in the embodiment of the present disclosure, the first compensating line 1053 and the second compensating line 1054 are electrically isolated from both the first and second parts of the second signal transmission line 1052, so the first compensating line 1053 and the second compensating line 1054 may not influence a signal transmission between the second touch electrode 1022 and a touch drive chip via the second signal transmission line 1052.

In addition, the first part of the second signal transmission line 1052 and a corresponding first compensating line 1053 are combined to form a conductive line throughout the upper and lower sides of the display area, and the second part of the second signal transmission line 1052 and a corresponding second compensating line 1054 are combined to form a conductive line throughout the left and right sides of the display area.

It can be seen from FIG. 5a that, the conductive lines arranged in the touch area 101 are distributed uniformly, thus the difference of display effects in different display areas caused by the non-uniform distribution of the conductive lines as shown in FIG. 3 and FIG. 4 may be solved, thereby improving the display effect.

In the above embodiment, the compensating lines are only arranged for the first part and the second part respectively. However, the compensating lines may further be arranged independently according to the embodiment of the present disclosure, whereby the conductive lines may be distributed more uniformly.

Figure 5B:
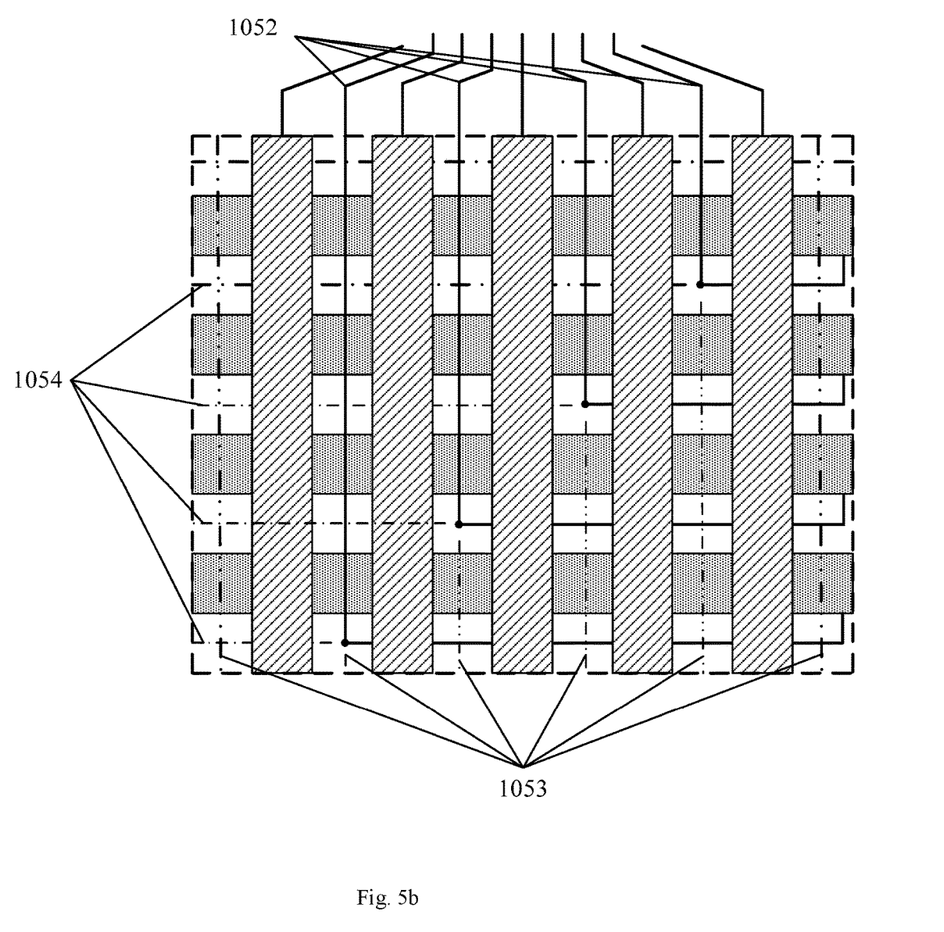
FIG. 5b is a schematic view showing a structure of a touch substrate added with compensating lines according to another embodiment of the disclosure.

As shown in FIG. 5b, the compensating lines are arranged independently. It can be seen that, the conductive lines in both the longitudinal and horizontal directions are distributed more uniformly, i.e., the touch effect and display are more uniform.

In the embodiment of the present disclosure, the touch substrate hereinabove may be a touch electrode made of a transparent conductive material such as ITO.

In the touch substrate formed by a touch electrode made of a transparent conductive material such as ITO, a resistance of an ITO material is much larger than that of a common metal material, so a RC delay may increase along with an increase of a size of the touch substrate, thereby a touch result may not be accurate.

In view of this, the touch substrate hereinabove is formed by a metal grid.

The resistance of a metal material is much smaller than that of the ITO material, so the metal material is more suitable for a large-size touch substrate. In addition, the metal material is more flexible than the ITO material, so the metal material is more suitable for a flexible displayer.

In addition, the metal material has advantages in terms of cost as compared with the ITO material, so the cost of the touch substrate may be reduced if the touch substrate is formed by a metal grid.

Because the metal is opaque, the metal may be hollowed out to form the metal grid if the touch electrode is formed by metal, so as to reduce the influence of the touch electrode on the display substrate.

Figure 6:
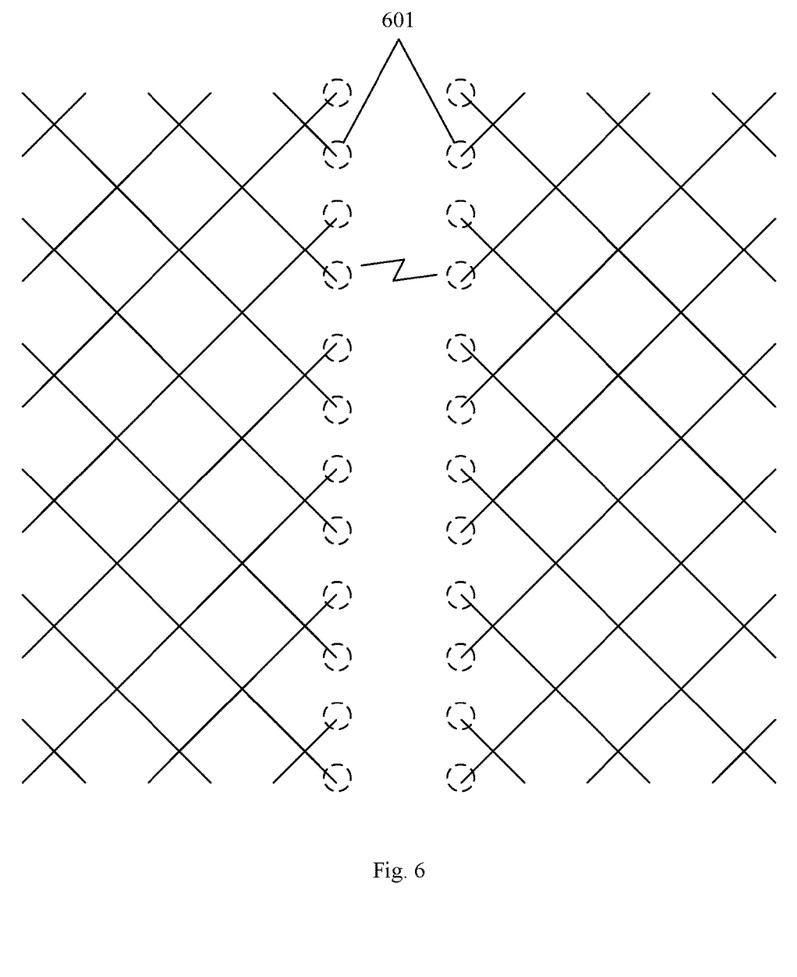
FIG. 6 is a schematic view showing a structure of a touch electrode formed by a metal grid according to an embodiment of the disclosure.

After the metal grid is formed, it may be divided, and then the adjacent two touch electrodes may be formed, as shown in FIG. 6.

It can be seen from FIG. 6 that, there exists a plurality of sharp point structures 601 (the parts surrounded by dotted circles in FIG. 6) at the edges of the two touch electrodes due to that the metal grid is divided. When the touch substrate works, electric signals are transmitted via the touch electrode. Because there exists sharp point structures 601, a point discharge may occur between the respective sharp point structures 601 of the adjacent two touch electrodes which are relatively closer to each other, and then the adjacent two touch electrodes may be conductive, thereby degrading a touch detection performance.

The point discharge hereinabove may occur between any adjacent electrodes. For example, after the virtual touch electrodes are added, the point discharge may occur between the virtual touch electrodes or between the touch electrode and the virtual touch electrode, and the above description is merely an illustration in the case that the point discharge occurs between the touch electrodes.

In the embodiment of the present disclosure, in order to avoid the point discharge, the touch substrate further includes at least one conductive connecting line when the first touch electrode 1021, second touch electrode 1022, first virtual touch electrode 1061 and second virtual touch electrode 1062 hereinabove are formed by metal grids, where each conductive connecting line corresponds to one metal grid and joints a plurality of sharp point structures of the metal grid together.

Figure 7A:
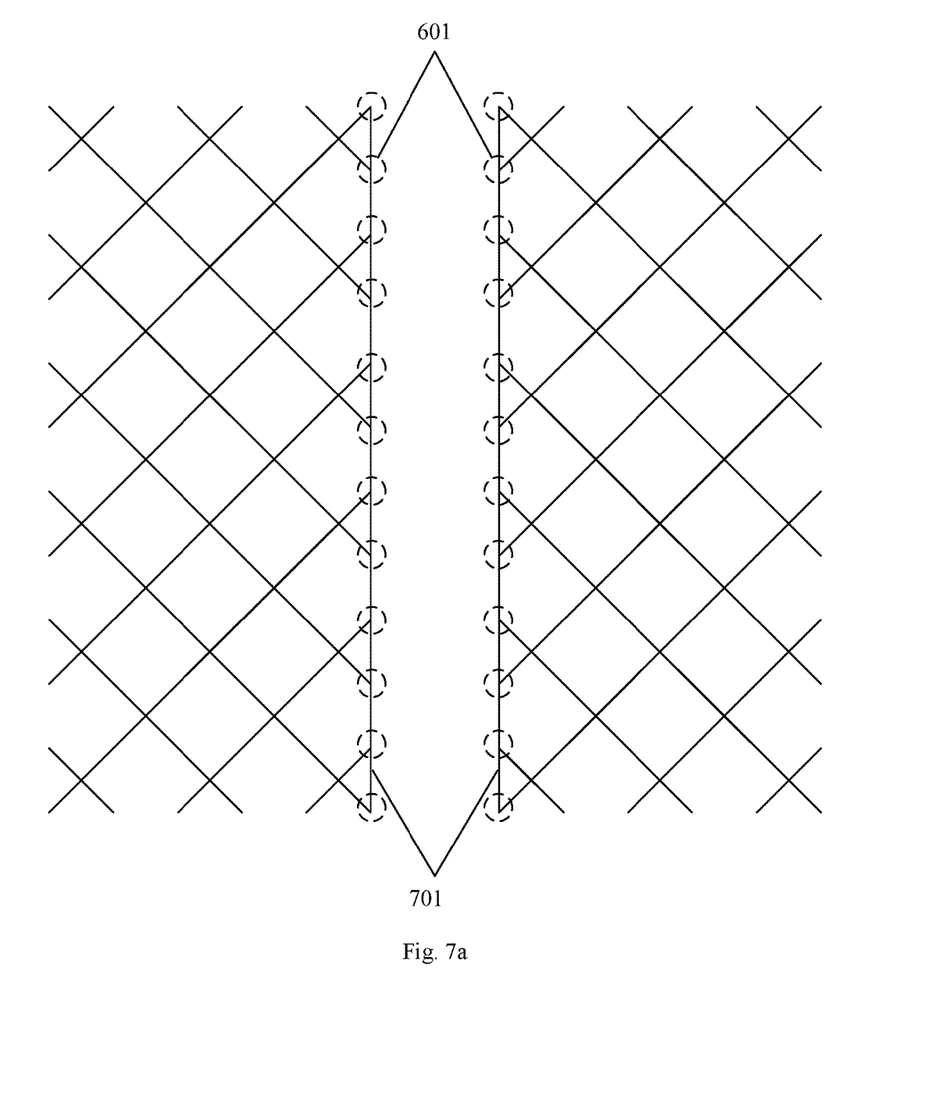
FIG. 7a to FIG. 7c illustrates a touch electrode added with a conductive connecting line according to an embodiment of the disclosure.

FIG. 7a is a schematic view showing the electrodes formed by metal grids and added with conductive connecting lines 701 according to an embodiment of the disclosure. It can be seen that, because there exist conductive connecting lines 701, the point discharge occurring between the sharp point structures 601 of the adjacent sides of the adjacent two touch electrodes may be eliminated effectively, thereby reducing a probability of point discharge significantly and improving a touch detection quality.

Figure 7B:
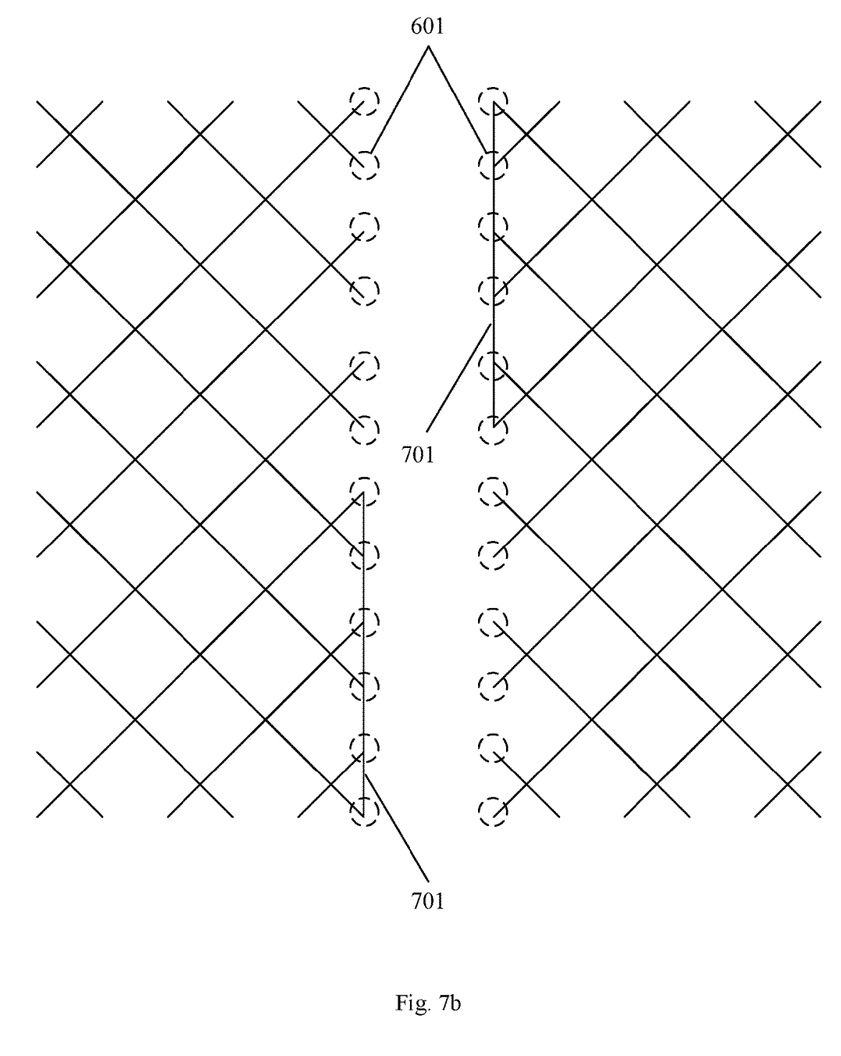
Figure 7C:
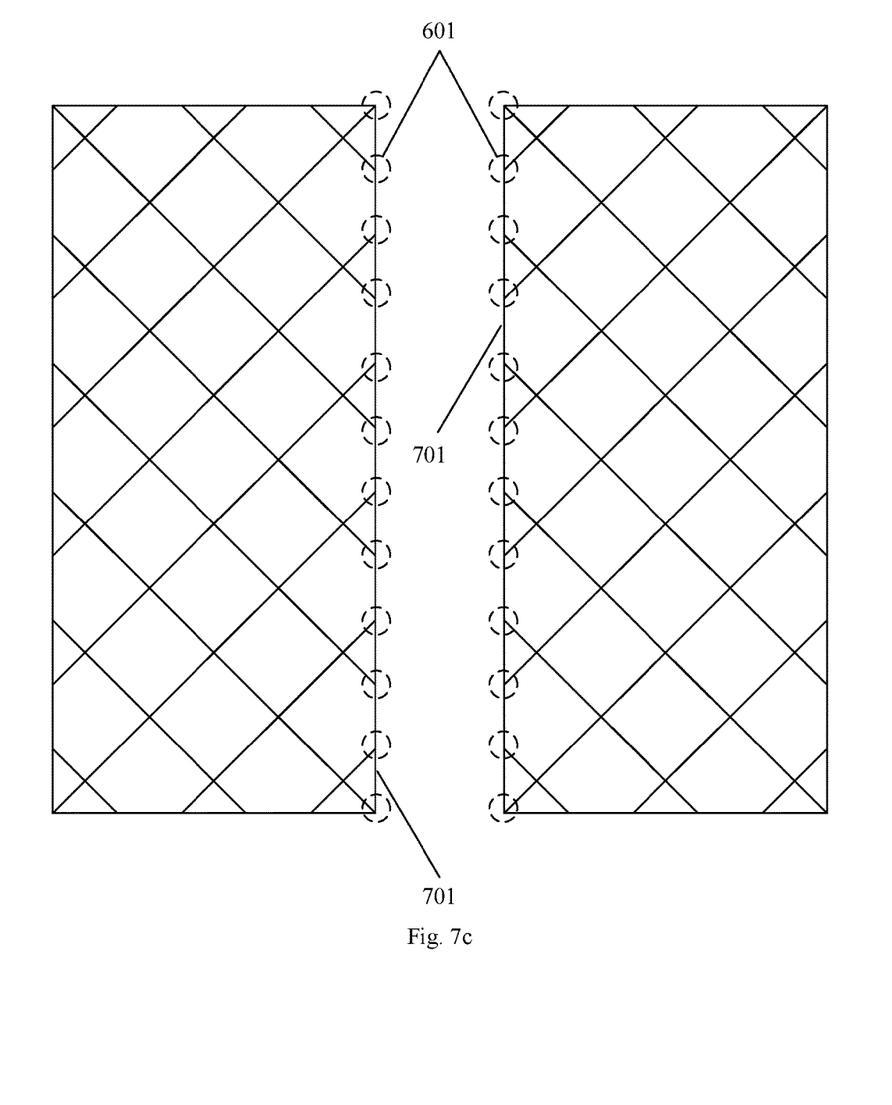

It should be understood that, the conductive connecting lines 701 may joint only a part of the sharp point structures 601 together, as shown in FIG. 7b and FIG. 7c. A probability of point discharge may be reduced as long as the sharp point structures 601 are equivalent to be reduced, thereby the touch detection quality may be improved.

As shown in FIG. 7c, the sharp point structures 601 of the metal grid are equivalent to be removed completely when the conductive connecting lines 701 form a rectangle frame surrounding the metal grid and join all the sharp point structures 601 together.

Figure 8:
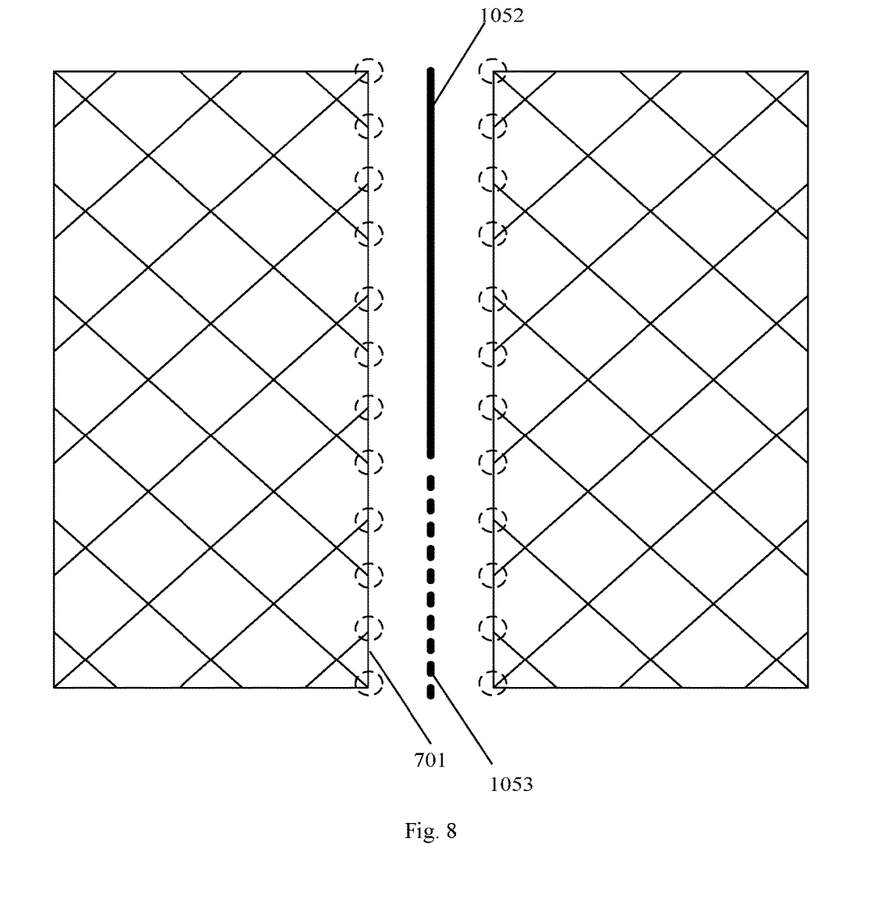
FIG. 8 is a schematic view showing a relative location of the added conductive connecting line, a second signal transmission line and a first compensating line according to an embodiment of the disclosure.

FIG. 8 is a schematic view showing a relative location of the added conductive connecting line 701, a second signal transmission line 1052 and a first compensating line 1053 according to an embodiment of the disclosure.

Figure 9:
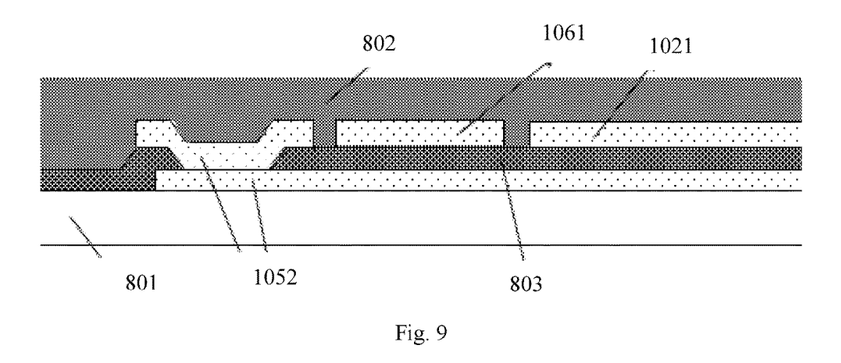
FIG. 9 is a schematic view showing a section of a touch substrate according to an embodiment of the present disclosure.

FIG. 9 is a schematic view showing a section of the touch substrate according to an embodiment of the present disclosure. A manufacturing process of the touch substrate according to an embodiment of the present disclosure may be briefly described in the following in conjunction with FIG. 9 and FIG. 4. The manufacturing process includes: forming a substrate 801; forming a pattern including a second touch electrode 1022, a second part of a second signal transmission line 1052 and a second virtual touch electrode 1062 on the substrate 801; forming a passivation layer 803 covering the pattern formed in the last step, and reserving a via hole for connecting to the second part of the second signal transmission line 1052; forming on the passivation layer 803 a pattern including a first touch electrode 1021, a first part of the second signal transmission line 1052 and a first virtual touch electrode 1061, where the first part of the second signal transmission line 1052 is connected to the second part of the second signal transmission line 1052 through the via hole formed in the last step; and forming a protection layer 802 covering the pattern formed in the last step, and reserving the via hole for connecting to the second part of the second signal transmission line 1052.

In order to achieve the above objective, a touch panel including the touch substrate hereinabove is further provided in an embodiment of the present disclosure.

A touch display device is further provided in an embodiment of the present disclosure, including the touch substrate hereinabove.

Those skilled in the art should understand that, several modifications and replacements made without departing from the principle of the present disclosure may also fall into the scope of the present disclosure.

What is claimed is:

1. A touch substrate, comprising a periphery area and a touch area, wherein:
   the touch area comprises a first edge and a second edge opposite to each other,
   the touch substrate comprises bonding terminals arranged in the periphery area, touch electrodes arranged in the touch area and signal transmission lines connecting the bonding terminals and the touch electrodes,
   the signal transmission lines are arranged between the first edge and the second edge,
   the bonding terminals comprise a first bonding terminal and a second bonding terminal arranged between the first edge and the second edge;
   the touch electrodes comprise a first touch electrode and a second touch electrode;
   the signal transmission lines comprise a first signal transmission line connecting the first bonding terminal and the first touch electrode and a second signal transmission line connecting the second bonding terminal and the second touch electrode;
   the first touch electrode extends toward a display area from the bonding terminals, and the second touch electrode and the first touch electrode are crossed to each other, and the first signal transmission line and the first touch electrode are arranged in a same layer;

the second signal transmission line comprises a first part arranged in a different layer from the second touch electrode; and a second part connected to the first part through a via hole, the second part is arranged in the touch area and in a same layer with the second touch electrode and electrically connected to the second touch electrode.

2. The touch substrate according to claim 1, wherein the first part and the first touch electrode are arranged in a same layer.

3. The touch substrate according to claim 1, wherein the touch substrate further comprises:
   a first virtual touch electrode, arranged between the first part and an adjacent first touch electrode; and/or
   a second virtual touch electrode, arranged between the second part and an adjacent second touch electrode.

4. The touch substrate according to claim 3, wherein the first touch electrode, the second touch electrode, the first virtual touch electrode and the second virtual touch electrode are formed by metal grids, wherein the touch substrate further comprises at least one conductive connecting line, wherein each conductive connecting line corresponds to one metal grid and joints a plurality of sharp point structures of the corresponded metal grid together.

5. The touch substrate according to claim 1, wherein first parts connected to different second touch electrodes vary in length, wherein the touch substrate further comprises:
   a first compensating line corresponding to the first part and arranged in the touch area, wherein the first compensating line extends from an end of the corresponded first part away from the bonding terminals to an edge of the display area, and the first compensating line is electrically isolated from the corresponded first part.

6. The touch substrate according to claim 5, wherein second parts connected to different second touch electrodes vary in length, wherein the touch substrate further comprise:
   a second compensating line corresponding to the second part and arranged in the touch area, wherein the second compensating line extends from an end of the corresponded second part connected to the first part to an edge of the display area, and the second compensating line is electrically isolated from the corresponded second part.

7. A touch panel, comprising the touch substrate according to claim 1.

8. A touch display device, comprising the touch panel according to claim 7.

9. The touch panel according to claim 7, wherein the first part and the first touch electrode are arranged in a same layer.

10. The touch panel according to claim 7, wherein the touch substrate further comprises:
    a first virtual touch electrode, arranged between the first part and an adjacent first touch electrode; and/or
    a second virtual touch electrode, arranged between the second part and an adjacent second touch electrode.

11. The touch panel according to claim 10, wherein the first touch electrode, the second touch electrode, the first virtual touch electrode and the second virtual touch electrode are formed by metal grids, wherein the touch substrate further comprises at least one conductive connecting line, wherein each conductive connecting line corresponds to one metal grid and joints a plurality of sharp point structures of the corresponded metal grid together.

12. The touch panel according to claim 7, wherein first parts connected to different second touch electrodes vary in length, wherein the touch substrate further comprises:
    a first compensating line corresponding to the first part and arranged in the touch area, wherein the first compensating line extends from an end of the corresponded first part away from the bonding terminals to an edge of the display area, and the first compensating line is electrically isolated from the corresponded first part.

13. The touch panel according to claim 12, wherein second parts connected to different second touch electrodes vary in length, wherein the touch substrate further comprise:
    a second compensating line corresponding to the second part and arranged in the touch area, wherein the second compensating line extends from an end of the corresponded second part connected to the first part to an edge of the display area, and the second compensating line is electrically isolated from the corresponded second part.

14. The touch display device according to claim 8, wherein the first part and the first touch electrode are arranged in a same layer.

15. The touch display device according to claim 8, wherein the touch substrate further comprises:
    a first virtual touch electrode, arranged between the first part and an adjacent first touch electrode; and/or
    a second virtual touch electrode, arranged between the second part and an adjacent second touch electrode.

16. The touch display device according to claim 15, wherein the first touch electrode, the second touch electrode, the first virtual touch electrode and the second virtual touch electrode are formed by metal grids, wherein the touch substrate further comprises at least one conductive connecting line, wherein each conductive connecting line corresponds to one metal grid and joints a plurality of sharp point structures of the corresponded metal grid together.

17. The touch display device according to claim 8, wherein first parts connected to different second touch electrodes vary in length, wherein the touch substrate further comprises:
    a first compensating line corresponding to the first part and arranged in the touch area, wherein the first compensating line extends from an end of the corresponded first part away from the bonding terminals to an edge of the display area, and the first compensating line is electrically isolated from the corresponded first part.

* * * * *